Feb. 23, 1926.
G. F. HOCHRIEM
COIN RETURN WEIGHING SCALE
Filed May 17, 1922    8 Sheets-Sheet 2
1,573,940
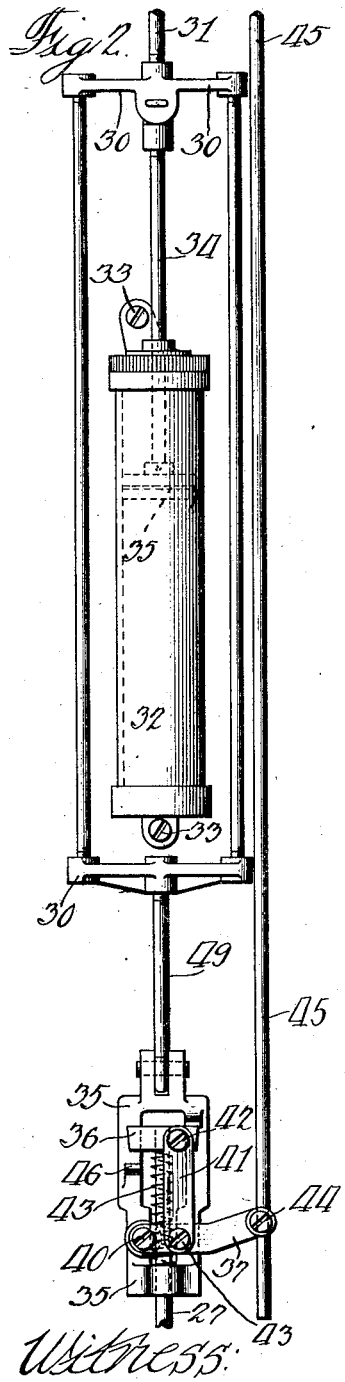
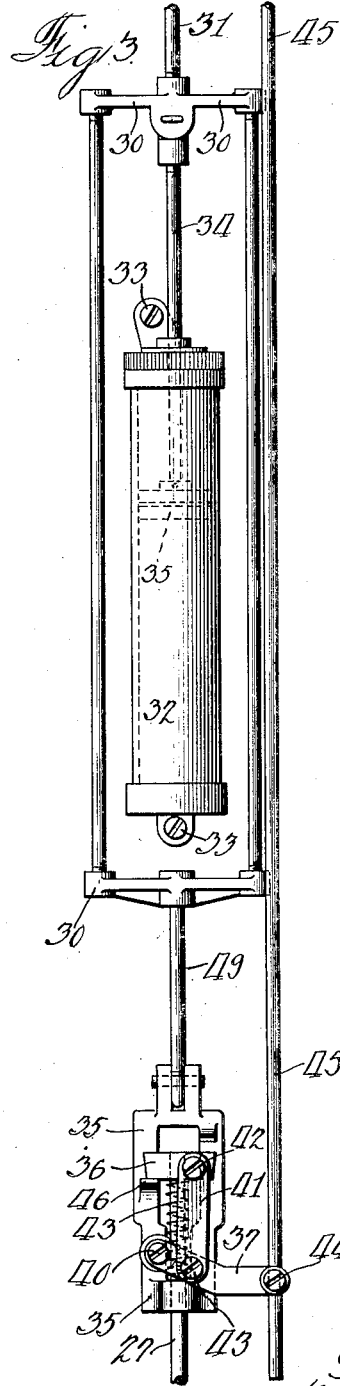
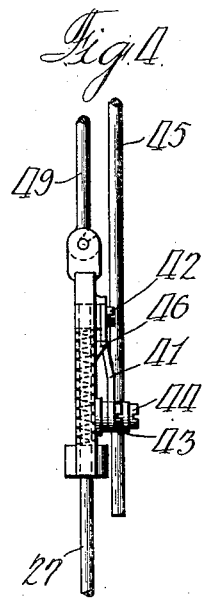
Witness:
Carl S. Magnusson
Inventor:
Gustav F. Hochriem
By Luther Johns Atty.

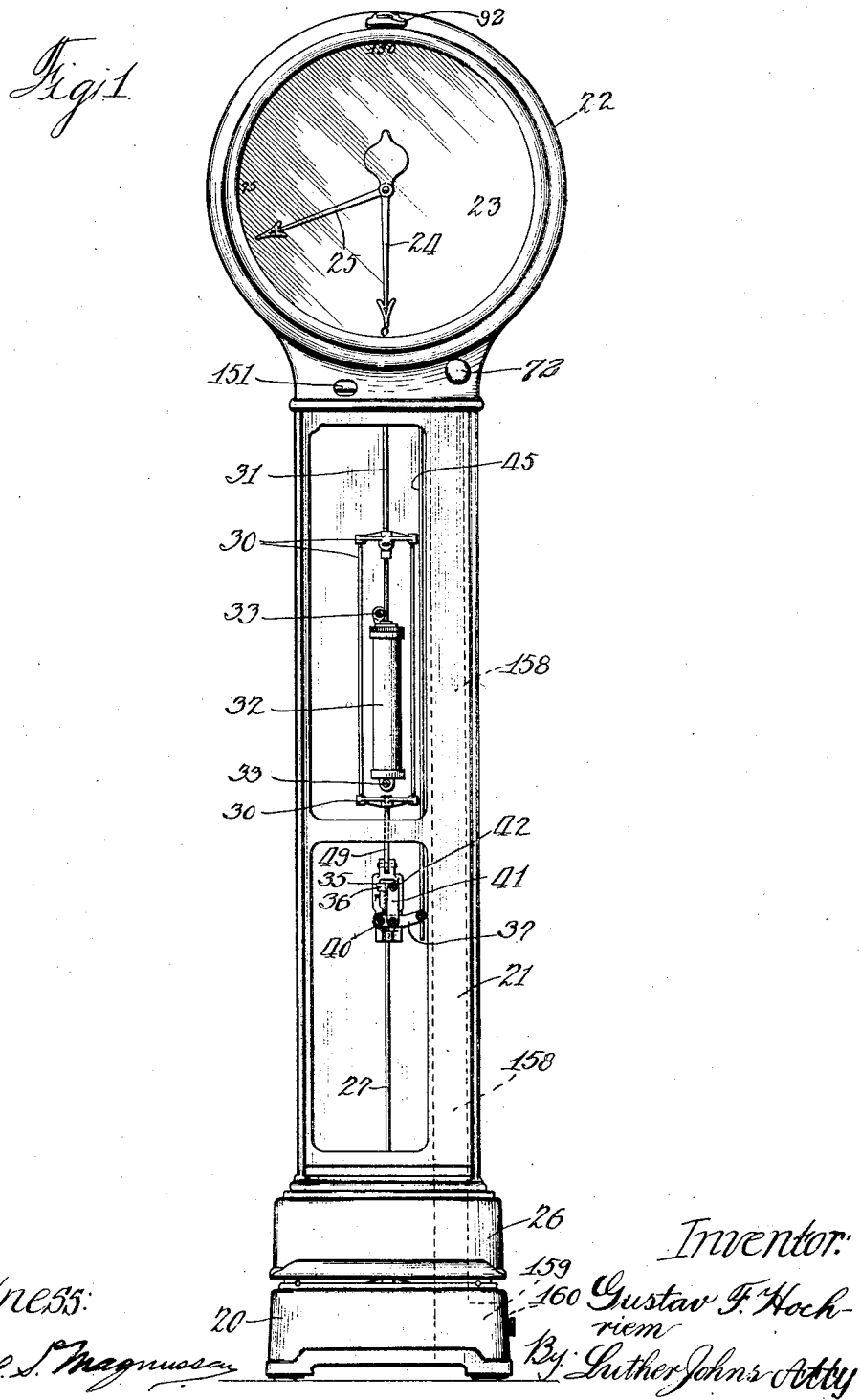

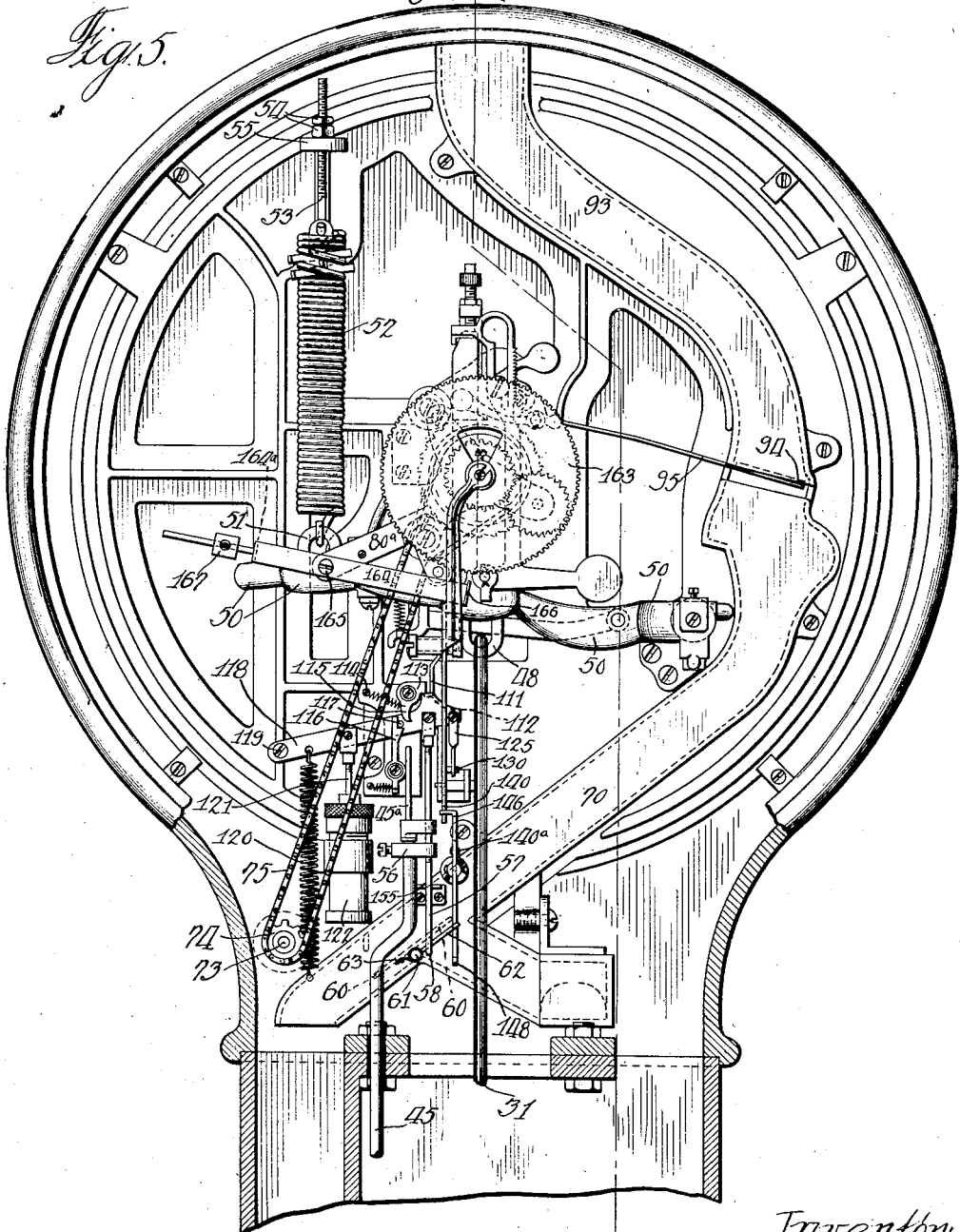

Feb. 23, 1926.
G. F. HOCHRIEM
1,573,940
COIN RETURN WEIGHING SCALE
Filed May 17, 1922
8 Sheets-Sheet 5
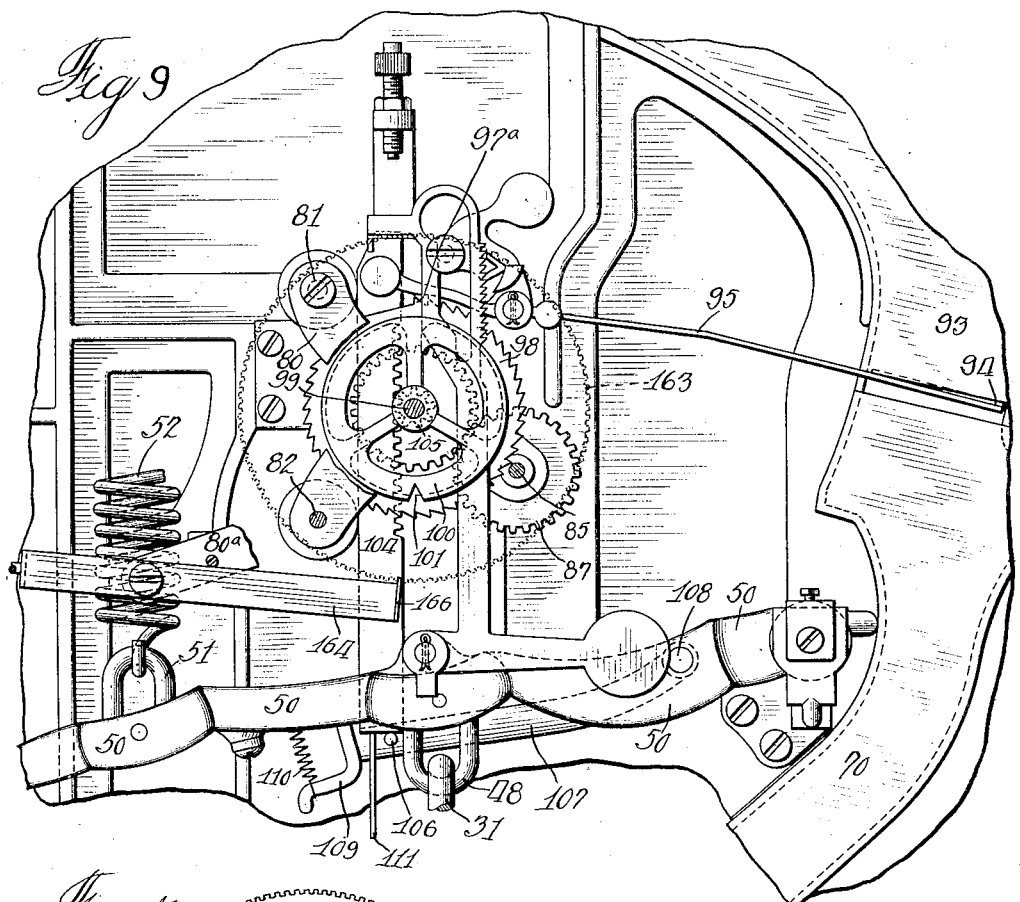
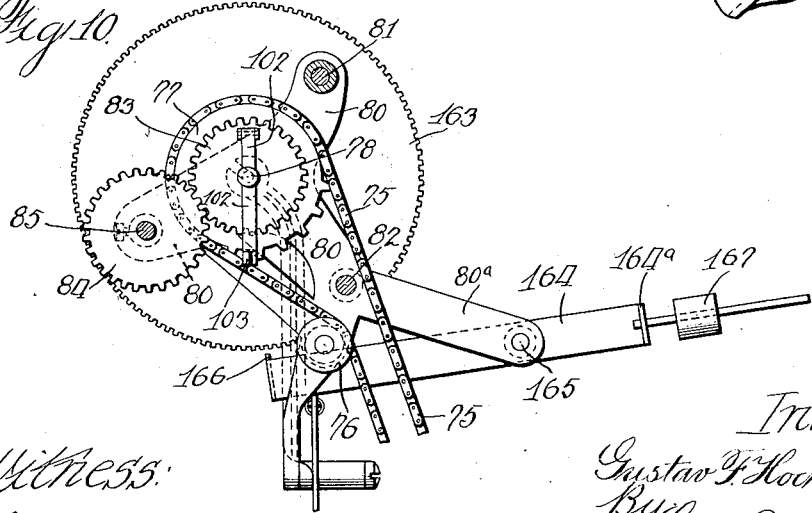

Feb. 23, 1926. 1,573,940
G. F. HOCHRIEM
COIN RETURN WEIGHING SCALE
Filed May 17, 1922   8 Sheets-Sheet 4
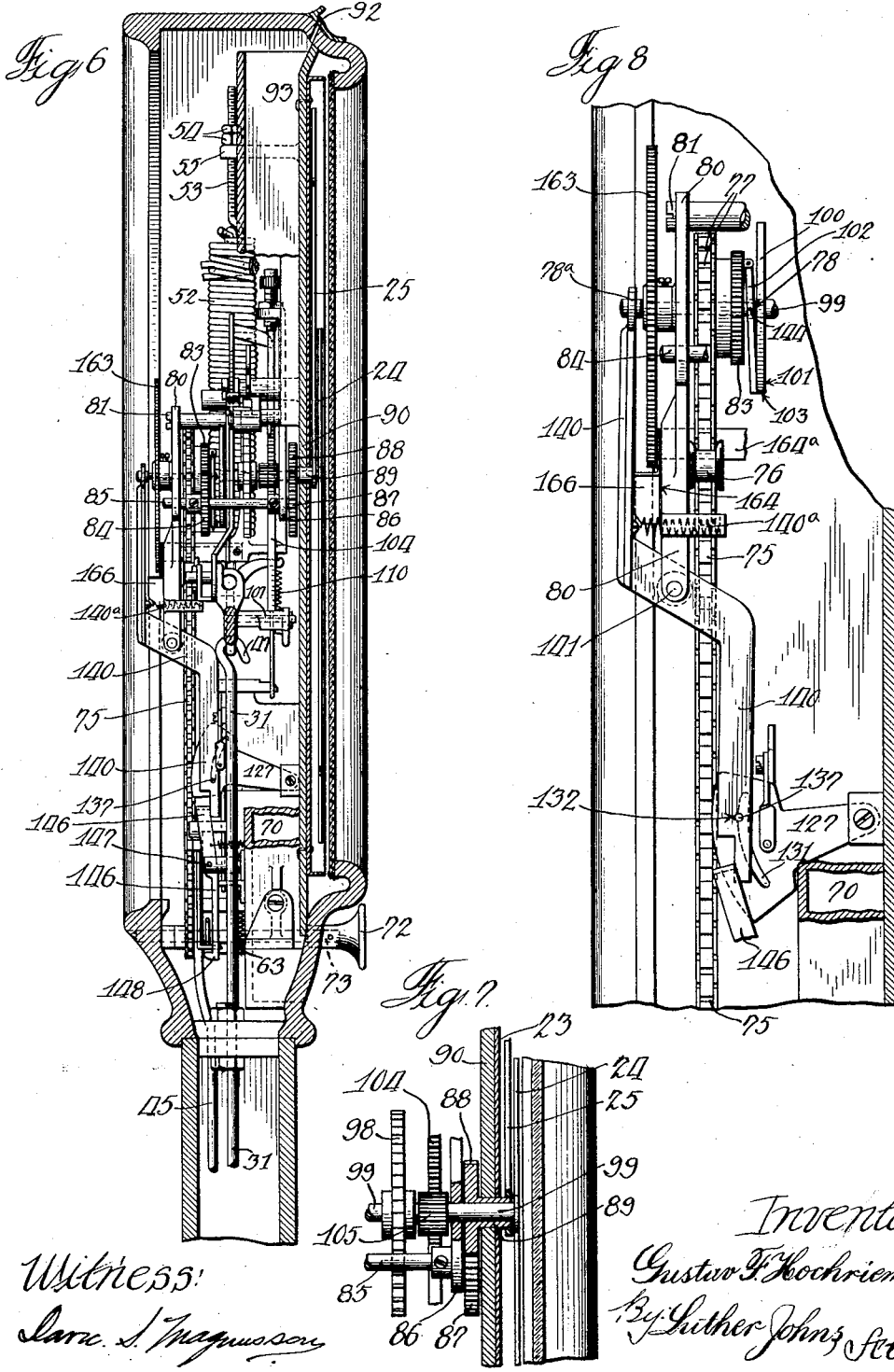
Inventor:
Gustav F. Hochriem
By Luther Johns Fetty Feb. 23, 1926.
G. F. HOCHRIEM
COIN RETURN WEIGHING SCALE
Filed May 17, 1922
1,573,940
8 Sheets-Sheet 6
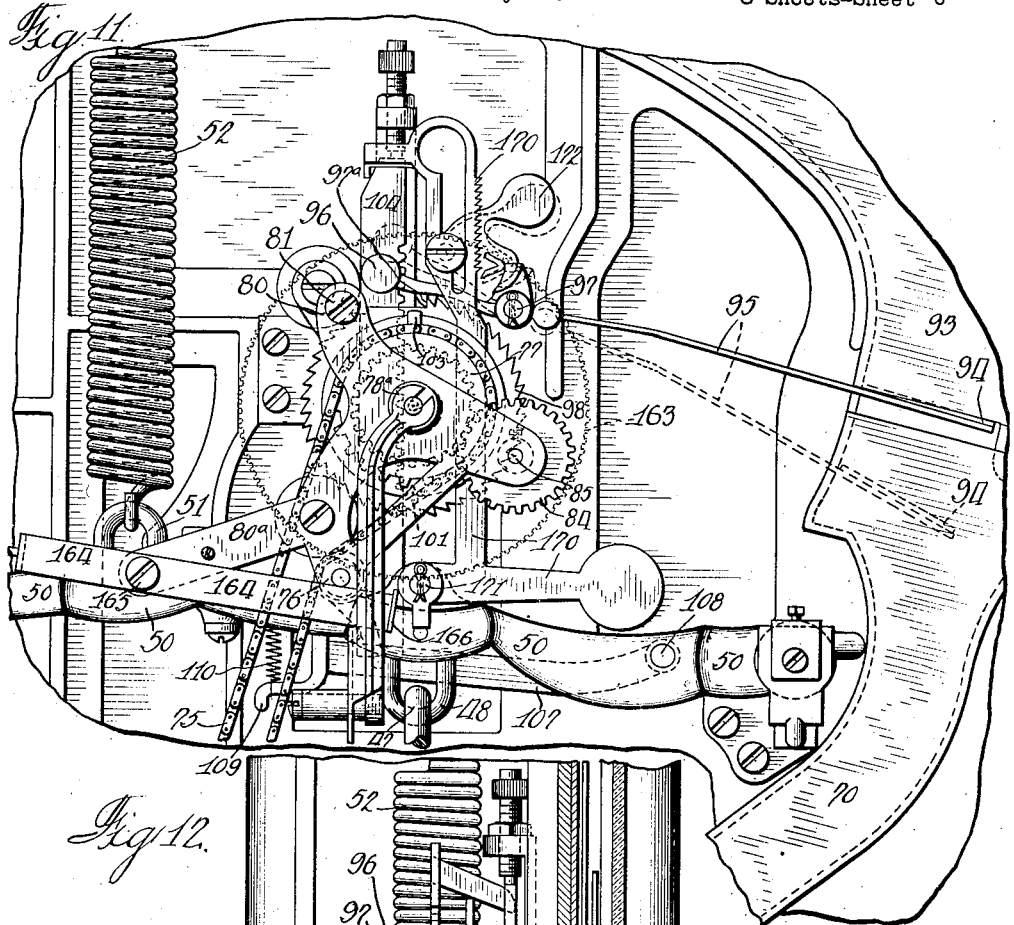
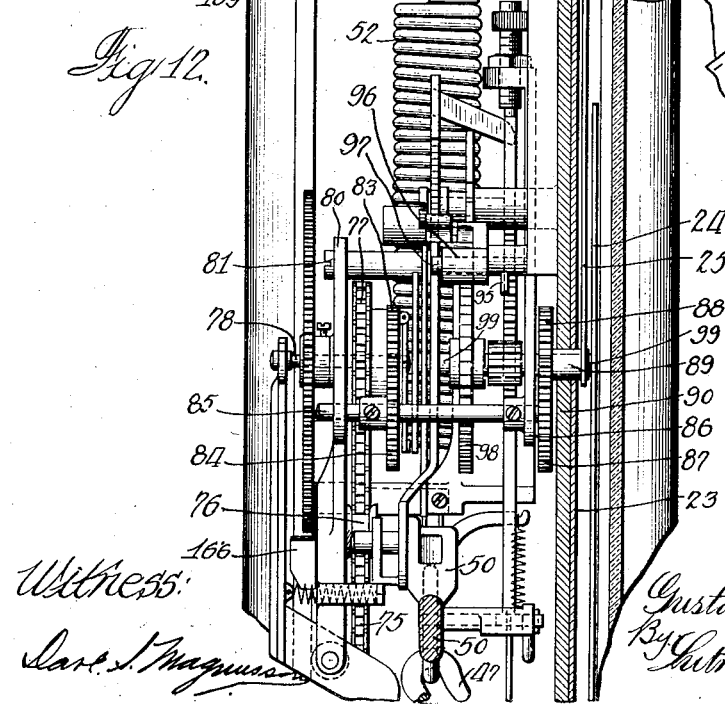
Inventor
Gustav F. Hochriem
By Luther Johns, Atty.

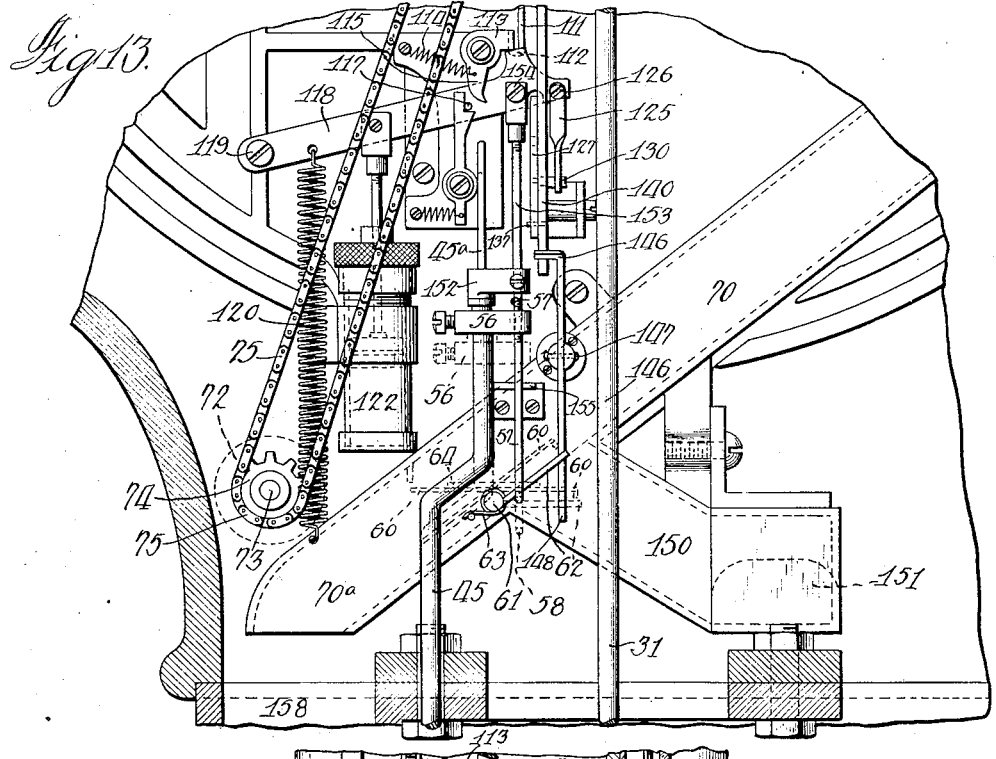
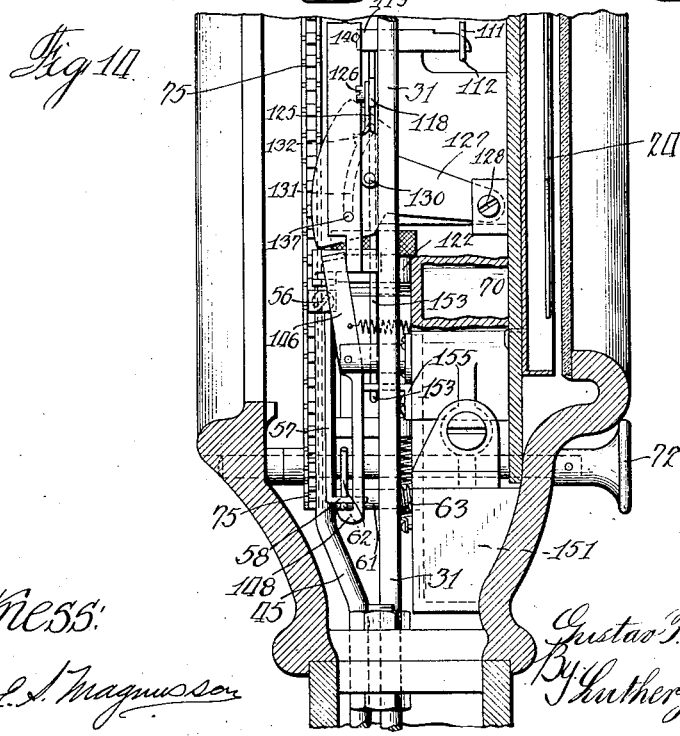

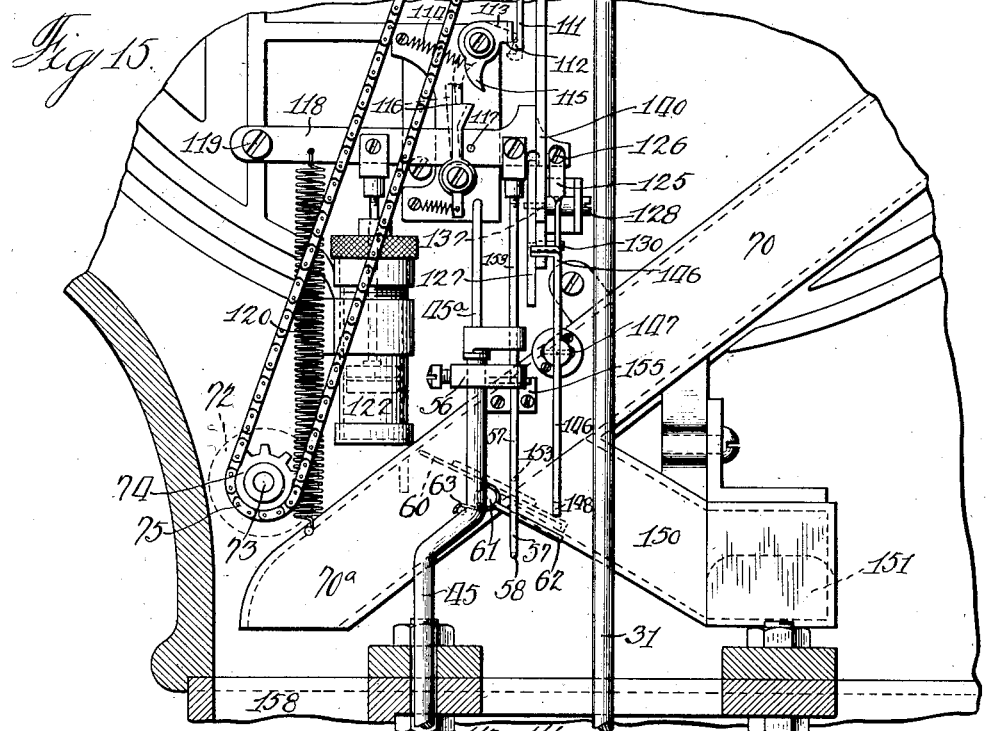

Patented Feb. 23, 1926.

1,573,940

UNITED STATES PATENT OFFICE.

GUSTAV F. HOCHRIEM, OF CHICAGO, ILLINOIS.

COIN-RETURN WEIGHING SCALE.

Application filed May 17, 1922. Serial No. 561,631.

*To all whom it may concern:*

Be it known that I, GUSTAV F. HOCHRIEM, a citizen of the United States, residing at Chicago, Cook County, Illinois, have invented certain new and useful Improvements in Coin-Return Weighing Scales, of which the following is a specification.

My present improvements relate to weighing scales of the kind which are used ordinarily to determine the weight of a person, which are rendered effective to indicate his weight by the deposit of a coin, and which are provided with means whereby such person may make a preliminary guess as to his weight and move a pointer accordingly, and thereupon if his guess be substantially correct the coin will be returned to him. The present improvements have to do more particularly with the coin-return mechanism of such scales as distinguished from the weighing mechanism.

Coin-return weighing scales having guess-indicating means are not broadly new. It has heretofore been suggested to provide the general results hereinabove indicated by scales and coin-return means which include the use of electricity. Various objections to such electrically controlled devices exist, among which may be mentioned the necessity for a current supply, usually provided by dry cells, the loss of effectiveness of the machine when the cells lose their power, the destruction or impairment of contact points through use, and the general delicacy of such machines, all and severally calling for careful watching, adjustment and repair from time to time.

The principal object of the present improvements is to provide a scale of the character described which is highly effective in operation and which operates wholly by mechanical means, and by means which may be of such strength and form as to last long in service and not be likely to get out of order, to the end that the various disadvantages of the electrically-operated form of device may be overcome, with a consequent saving of cost of manufacture and maintenance, and with improved satisfaction to the public using such scales.

More specific objects relate to features of construction; and other general and specific objects and advantages will appear hereinafter.

In the accompanying drawings, which form a part of this specification, Figure 1 is a front face view of a scale or weighing device embodying these improvements; Fig. 2 is an enlarged detail of certain mechanism exposed in Fig. 1; Fig. 3 shows the parts of Fig. 2 in other relative positions; Fig. 4 is a fragment of parts viewed from left to right at right angles to the view of Fig. 3; Fig. 5 is a rear face view of the upper portion of the mechanism, the rear wall or cover of the casing being removed and the casing or frame being partly broken away; Fig. 6 is a substantially medial vertical section at right angles to the view of Fig. 5 as approximately on the line 6—6 thereof; Fig. 7 is an enlarged fragmentary sectional detail showing parts for operating the indicating hands; Fig. 8 is an enlarged fragmentary view showing parts illustrated in Fig. 6, but in other relative positions; Fig. 9 is a fragmentary face view of details of the weighing and releasing mechanism; Fig. 10 is a fragmentary view, as from the front of the device, showing some of the mechanism for moving the guessing hand and associated parts; Fig. 11 is an enlarged fragmentary view of parts shown in Fig. 5; Fig. 12 is a view at right angles to the view of Fig. 11; Fig. 13 is a fragmentary continuation from Fig. 11 of the associated mechanism shown assembled in Fig. 5; Fig. 14 is a view at right angles to the view of Fig. 13; Fig. 15 is a view similar to Fig. 13 but showing certain parts in other relative positions; Fig. 16 is a view at right angles to the view of Fig. 15; and Fig. 17 is a detail showing a construction for adjustments omitted from other figures.

Referring to Fig. 1 the various mechanisms are housed in a frame, in my practice of cast iron, having a forwardly extending base 20, an upwardly-extending hollow body part 21 and a circular head 22 carrying a dial 23 over which travel from a common axis the weighing hand or pointer 24 and the guessing hand or pointer 25. The base 20 is covered by a platform 26 adapted to be stood upon by a person and to move downward under the influence of his weight. It is to be understood that the base 20 contains a system of levers constituting a part of the weighing mechanism, these levers being so connected with the vertical rod 27 as to move that rod downward when weight is placed upon the platform 26. The lever connections in the base 20 are not illustrated since platform scale weighing mechanism suitable for the purpose is well known.

Referring to Figs. 1, 2, 3 and 4 it will be noted that the pull rod 27 is secured to rectangular frame 30 and that another pull rod 31 extends upward from this frame; that a cylinder 32 is secured, as by screws 33, rigidly to the frame of the machine; that a piston rod 34 carrying a piston 35 is secured to the frame 30 whereby when the rod 27 is moved downward the piston will also be moved downward in the cylinder 32. The cylinder 32 may be considered as containing oil adapted to leak around the edges of the piston or through a hole in the piston whereby when a person steps upon the platform 26 his suddenly-applied weight will not impose a jerk upon the weighing mechanism but will be gradually applied. This piston and cylinder construction is a well-known feature of scales of this general type.

A feature of novelty in this connection is the mechanism shown in the lower part of Figs. 2 and 3 and in Fig. 4. This mechanism includes a frame 35 carrying a vertically-moving cross-head 36 to which the rod 27 is connected. A lever 37 is pivotally mounted at 40 on the frame and a link 41, connected at 42 to the cross-head and at 43 to the lever 37, moves the lever 37 downward when the rod 27 is drawn downward relative to the frame 35. The coiled spring 43 on the rod 27 raises the cross-head 36 in the frame 35 when the weight is removed. Since the lever 37 is relatively long from 43 to 44 its outer end at the screw 44 travels a materially greater distance than does the cross-head, with the result that the vertical rod 45 is pulled downward with a considerable greater amount of movement than that of the rod 27. A stop 46 limits the downward movement of the cross-head 36. The rod 49 is a mere connection between the frames 30 and 35.

A description of the weighing, releasing and coin-return mechanism will probably best proceed in the order of the various movements which take place during the operation of the device.

Let us assume that a person desiring to weigh himself, but not interested in the coin-return feature, has stepped upon the platform 26. The weight on the platform draws downward the rod 31 (Figs. 5 and 6) having a hook 47 engaging a loop 48 secured to the main weighing lever 50 (Fig. 9), the lever 50 having an eye or loop 51 into which is hooked the weighing spring 52, the upper end of the spring 52 (Fig. 6) being connected to a threaded rod 53 vertically adjustable by means of the nuts 54 bearing against an extension 55 of the frame. The weight of the person on the platform therefore pulls against and is balanced by the spring 52. While the rod 31 has thus been drawn downward the other vertically disposed rod 45 has also been drawn downward, and to a greater extent, and has moved the head 56 thereon downwardly into its dotted line position shown in Fig. 13. The head 56 carries positively the vertically disposed and depending rod 57 which is bent over horizontally at 58 (Fig. 14). From Fig. 5 it will be observed that a plate or platform 60 (shown by dotted lines) is pivoted at 61 and that there is a pin 62 secured to the shaft 61. The bent-over part 58 of the vertical rod 57 extends beneath this pin 62. Fig. 5 shows these parts as they appear before the person has stepped upon the platform. When weight is put upon the platform the vertical rod 57 is drawn downward and the platform 60 takes a horizontal position, a leaf spring 63 causing the pin 62 to follow after the descending bent-over part 58.

This platform 60 is in a coin channel 70, and when in its horizontal position, as shown in dotted lines in Fig. 13, a coin passing downward through the channel 70 will stop and rest upon this platform 60. Such a coin is indicated at 64, Fig. 13.

It will thus appear that when a person steps upon the platform the weighing mechanism has been put into such operation that an equilibrium has been attained between the weight and the main spring 52, and that the platform 62 has been brought into a horizontal position which closes the channel 70. Up to this time a coin has not been deposited in the device and therefore, although the desired equilibrium is attained there is no indication on the dial of the weight. The deposit of a coin is necessary to cause the weighing pointer to indicate the proper weight.

We have thus far shown some of the movements when a person merely steps upon the platform. A more detailed description follows in connection with the guessing feature. This provides for the return of the coin should the operator's guess be correct or substantially correct. To utilize this feature the operator will first, and before stepping upon the platform, set the guessing hand 25 to some mark upon the dial which he believes to be his correct weight.

For setting the guessing hand 25 the operator turns the knob 72 on the shaft 73, which shaft carries a sprocket 74 on which travels the endless chain 75 which passes upward, and one of its sides is deflected by an idler 76 Fig. 11, the chain then encompassing a sprocket 77, Fig. 10, which is mounted on a shaft 78. Note from Fig. 8 where the shaft 78 ends, the arrow head of the lead line being directed to its end. From Figs. 8, 9, 10 and 12 it will be noted that this shaft 78 is mounted in a bracket 80 rigidly secured as by screws 81 and 82 upon a relatively fixed frame part carrying other mechanism. The shaft 78 also carries positively a gear 83 meshing with a gear 84 on a shaft 85 which is also mounted to rotate in the frame 80, the other end of the shaft 85 being mounted in a bracket 86 and carrying a gear 87 meshing with a gear 88 having a sleeve or collar 89 projecting through the front wall 90 on which the dial 23 is mounted, this front wall 90 acting as a bearing for the sleeve 89 and gear 88. The guessing hand or pointer 25 is mounted on the sleeve 89, and it is therefore clear that when the exposed knob 72 is turned the rotative movement will be conveyed to this pointer.

Assuming that the person has moved the guessing pointer 25 to a particular place, and then stepped upon the platform, the device is now in condition to receive a coin adapted to set in operation means for indicating the correct weight, for returning the coin under certain conditions, etc.

We will now, therefore, assume that a coin has been deposited in the slot 92 and passes downward through the conduit or channel 93 Figs. 5, 9 and 11 and strikes the plate 94 upon the rod 95, the weight of the coin causing this plate 94 to move downward, as shown by dotted lines in Fig. 11, the coin hereupon sliding off of the plate and passing on downward through the channel 70 and lodging on the horizontally disposed plate 60 (Fig. 13).

The rod 95 is connected to a weighted lever arm 96 pivoted at 97 (Fig. 11) and carrying a dog or tooth 97ᵃ adapted to engage a tooth where several teeth are omitted in the ratchet wheel 98 when the parts are in normal position preparatory to beginning the weight-indicating movements. The downward movement of the rod 95 raises this dog out of engagement with such tooth. The ratchet wheel 98 is on a shaft 99 which extends through the hollow sleeve 89, and the weighing hand 24 is rigidly secured to this shaft 99. From Fig. 8 it will be observed that the shaft 99 (which is on the same axis as the shaft 78) terminates closely adjacent to the shaft 78, and these two shafts 78 and 99 operate independently of each other. At the end of the shaft 99, Fig. 8, there is a disc 100 having a peripheral notch at 101, well seen in Fig. 9. It will be observed from Fig. 8 that the gear 83 carries pivotally mounted thereto a lever 102 having a projection 103 (see Fig. 10) adapted to enter the notch 101 when the notch and the projection are brought opposite to each other.

When a person steps upon the platform, as has already been observed, the desired equilibrium between the weight of the person and the weighing spring 52 is at once had, and at that time the notch 101 has assumed some particular relative position in its circular course of travel dependent upon the weight of the person on the platform. This relative position of the notch 101 was brought about through the action of a rack-bar 104 engaging a small pinion 105 on the shaft 99 carrying the ratchet 98. The rack-bar 104 descends by gravity and its weight turns the ratchet wheel 98 when the dog 97ᵃ is raised. The extent of the downward descent of the rack-bar 104 is determined by the position of a stop 106 on a lever 107 pivoted at 108 upon the main lever 50. This auxiliary lever 107 has an extension 109 and a spring 110 holding it in its normal position and thus when the rack-bar 104 descends and strikes the stop 106 the spring 110 yields a little and thus a springy seat is provided for the rack-bar in its downward movement. Since the weight of the person draws the main lever 50 downward a particular amount according to the weight of the person on the platform the rack-bar descends correspondingly more or less according to the weight of such person, and therefore the ratchet 98, and with it the notch 101 in the disc 100, move in their respective arcuate paths to a greater or less extent corresponding to the weight upon the platform. The relative position of the notch 101 always therefore corresponds to the weight upon the platform, and since the weighing pointer indicates the weight of the person, the relative position of the notch 101 always corresponds to the relative position of the weighing pointer. Since the guessing pointer and the projection 103 move around in their respective arcs of travel at the same rate, the relative position of the projection 103 always corresponds to that of the guessing pointer. If, therefore, the guessing pointer be turned by hand to a given position on the dial, thus setting also the relative position of the projection 103, and then it should happen that the weight of the person on the platform be such as to bring the weighing pointer to the same or approximately the same place as that indicated by the guessing pointer, the notch 101 will be directly opposite the projection 103. In every other relative position of the two pointers the notch 101 and the projection 103 will not be opposite each other. The return of the coin, according to the specific mechanism illustrated, depends strictly upon the oppositely disposed relation of the notch 101 and the projection 103.

This means that the two hands on the face of the dial must be opposite each other and point to the same or substantially the same weight on the dial. Ordinarily the notch 101 will be somewhat larger than the projection 103 so that if the person guesses within a pound of his correct weight, in one direction or the other, the machine will operate to return the coin. If the notch 101 were made still larger the latitude in this direction would be greater still. This allowance of a little latitude in guessing is merely a concession to the weigher, however, and it is obvious that the machine could be made so that the coin would be returned only when the exact weight is guessed.

Next in the natural order of development is an explanation of the mechanism which releases the coin to the operator in case his guess be correct, or diverts it to a locked compartment in case his guess be wrong. From Fig. 9 it will be observed that a rod 111 projects downward from the lower end of the rack-bar 104. From Figs. 5, 15 and 16 it will be observed that the rod 111 has a hook 112 at its bottom which engages one arm of a bell crank lever or dog 113. From Fig. 15 it will be observed that when the rod 111 moves downward the dog 113 is released whereby the spring 114 may swing the projection 115 of the dog 113 to the left, as shown in dotted lines, moving the catch 116 to the left and out of engagement with the stop 117, (Fig. 5) on the lever 118 pivoted at 119 upon a frame part of the machine. The lever 118 is constantly sought to be drawn downward by the coiled spring 120, but this action is restrained by the stop 117 except when the release is made as just above indicated.

Also secured to the lever 118 is the piston rod 121 which is to be understood as having a piston head loosely movable in the cylinder 122 rigidly carried by the frame. It is also to be understood that there is oil in the cylinder 122 which may leak around the edges of the piston or pass through a hole therein from one side of the piston to the other. The function of this cylinder 122 and piston within it is to slow down the movement of the lever 118 to provide a delay movement of other parts.

Fig. 13 shows the parts in their relative positions before the release has been made of the lever 118 through the descent of the rod 111 and its hook 112, while Fig. 15 shows the parts after the release mentioned and after the spring 120 has drawn the lever 118 downward its full extent. In Fig. 13 the parts are illustrated as being in their normal relative positions before the person has stepped upon the platform. The dotted line position of the stop 56 shows the position of that part after the person has stepped upon the platform. Fig. 15 shows the relative position of parts after the person has stepped upon the platform and has deposited a coin.

Referring to Figs. 13 and 15 a depending link 125 is pivotally connected at 126 to the end of the lever 118. An upwardly-and-downwardly swinging plate 127, Figs. 14 and 16, is pivotally mounted at 128 to the frame and is connected at 130 to the link 125. There is an arcuate slot 131 on the radius of the axis 128 in the plate 127, and, as shown in most of the figures, there is a notch or enlargement 132 at one side of this arcuate slot 131. From Fig. 17 it will be observed that this notch 132 is defined by a plate 133 held adjustably by means of screws 134 and slotted openings 135 upon the plate 127, the arcuate slot 131 being enlarged at 136 for a short distance under the plate 133 whereby the notch 132 may be effective at various positions of adjustment. This adjusting feature for the notch 132 has been omitted from the other figures to simplify illustration. The adjustment of notch 132 increases or decreases the delay in the coin-return operations.

There is a stud or pin 137 positioned in the arcuate slot 131. From Figs. 6, 8, 13 and 15 it will be observed that this stud or pin 137 is secured upon an up-and-down lever 140 pivoted at 141 to a part of the frame 80. This lever 140 has therefore rocking movement. It is constantly drawn by the spring 140ª (Fig. 8) whereby the stud 137 will always bear against that wall of the arcuate slot 131 which has the notch 132. When the plate 127 is moved downward and the notch 132 is brought opposite the stud 137 the spring 140ª draws the lever over and the stud enters the notch, as shown in Figs. 8 and 16.

This last statement that the stud 137 enters the notch 132 is subject to qualification, for that fact depends upon the relationship of the notch 101 and the projection 103 (Fig. 8) at the time the notch 132 is opposite the stud 137. From Fig. 8 it will be noted that the upper end of the lever 140 is swiveled upon the shaft 78 at 78ª. The shaft 78 is loosely positioned in the gear 83 and sprocket 77 and may move back and forth relative to these parts. The shaft 78 is pivoted upon the lever 102, as by a pin 144 whereby the in-and-out movement of the shaft 78 will move this lever 102 toward and away from the plate 100. If, then, the notch 101 in the plate 100 and the projection 103 on the lever 102 are opposite each other when the notch 132 is opposite the stud 137, the stud 137 will enter the notch 132 and the projection 103 will enter the notch 101. If the notch 101 and the projection 103 are not opposite each other when the notch 132 is opposite the stud 137 the spring 140ª will pull the lever 140 over and move the lever 102 a trifle, but thereupon the projection 103 will strike against the face of the plate 100 and, the stud 137 being thereby held away and out of the notch 132, the further downward movement of the swinging plate 127 will carry the notch 132 beyond the stud 137.

We have thus noted that when the operator's guess is correct, the projection 103 and the notch 101 are brought opposite each other and a rocking movement of the lever 140 is induced through the action of the spring 140a, which movement was permitted to occur at a particular place in the downward travel of the swinging plate 127, namely at the notch 132 therein. The further explanation shows what happens due to the movement of this lever 140, and also what happens when the lever 140 is not permitted to move, as is the case when the operator does not guess his weight.

From Fig. 8 is will be noted that the lower end of the lever 140 bears against a lever 146, fragmentarily there shown. This lever 146 is more fully shown in Fig. 16 in side view, from which it appears that the lever 146 is pivoted at 147 upon a frame part, and that the lower end of the lever 146 has a hook 148. From Figs. 13 and 14 it will clearly appear that when the coin-supporting plate 60 is in horizontal position, thus holding the coin for deflection in one direction or another, the pin 62 (beneath the plane of the plate 60 and secured to the shaft 61 to which the plate 60 is also secured) is resting upon the hook 148. Now when the lever 140 is moved on its axis by the spring 140a (Fig. 8), namely when the stud 137 is permitted to enter the notch 132, the hook 148 is moved out of its holding relation to the pin 62, as shown in Fig. 16, and thereupon the spring 63 (Fig. 13) throws the plate 60 and pin 62 downward, or into the relative position shown in Figs. 15 and 16, and thereupon the coin is discharged into the chute or passageway 150 leading to an opening 151 (Fig. 1) where there is a little outwardly-open compartment to receive it and from which the operator may recover it. It is accordingly made clear that when the operator moves the guessing pointer to a given weight-indication on the dial and then, after stepping on the platform and depositing a coin, the weighing pointer indicates the same or substantially the same weight, certain parts are automatically brought into such relation to each other that the movement of a part, as the hook 148 (Fig. 16), permits the coin to be diverted into a channel leading to a place within the operator's reach.

Let us suppose, next, that the operator did not correctly guess his weight. In such case no material movement of the lever 140 takes place, as already pointed out, and the coin-holding plate, or butterfly valve 60, remains in its horizontal position, as in Fig. 13, until the person steps off the platform, when the rod 45, which was drawn down a materially great distance through the mechanism illustrated in Figs. 2, 3 and 4, now rises or returns to its normal position through the action of the pull rod 27 (Fig. 1) and the mechanism connected to it at its upper end, the weighing spring 52 restoring the various parts to their normal relative positions. From Figs. 5, 13 and 15 it will be noted that a rod 45a projects upward from the rod 45 and serves as a guide for the sliding block 152. This block 152 is secured, as by means of a set screw, upon a rod 153 connected at 154 to the lever 118. The rod 153 is guided in a bracket 155. When the person steps upon the scale the head or push member 56 is drawn downward, or into its dotted-line position in Fig. 13, and when a coin has been deposited the block 152 descends and rests upon the push member 56. When the person steps off the platform and the rod 45 rises the member 56 pushes the block 152 upward, thereby pushing the lever 118 upward, thereby also restoring the original position of the swinging plate 127 and its associated parts, and, through the action of the turned-over part or hook 58 on the rod 57 engaging the pin or rod 62 on the butterfly valve 60, the pin and with it the valve are swung in the anti-clockwise direction, as viewed in Fig. 13, and the coin is discharged into the channel 70a. This channel 70a opens into a channel 158 (Fig. 1) leading to a receptacle 159 having a locked door 160 from which the coin may be removed by an authorized person.

The butterfly valve 60 remains slanting downward so as to discharge into the channel 70a until weight is again applied upon the platform, at which time, due to a lowering or pulling-down movement upon the rod 45, the butterfly valve pin 62 is permitted to follow after the hook 58 until it is stopped in a horizontal position by the hook 148.

Referring to Figs. 5, 9, 10 and 11 it will be noted that there is a relatively large wheel 163, shown in Figs. 9 and 11 only in dotted lines for clearness of illustration, provided with a multitude of relatively fine teeth on its periphery, and that a lever 164 is pivoted at 165 upon frame part 80a and has a bent-over part 166 adapted to engage these teeth. A weight 167 tends to move the part 166 into engagement with the teeth of the wheel 163, but when the parts are in their normal position before weighing begins, as in Fig. 5, such locking cannot take place, because the bent-over part of the lever 164a (Fig. 8) extends so as to overlie a part of the lever 50, as well shown in Fig. 5. Now when a person steps upon the platform this free end of the lever 50 descends and the weight 167 descends with it, the locking part 166 then engaging the teeth of the wheel 163. Since the wheel 163 is on the shaft 78 (Fig. 8) and turns with it, and since this shaft 78 was turned by hand in making the guess before the operator stepped upon the platform, his stepping on the platform locks the wheel 163 and all of the other guessing mechanism in the relative positions in which the operator placed them by hand. He may not therefore change his guess after stepping on the platform, unless he steps off again before depositing a coin. As soon as he deposits the coin, having first stepped upon the platform, the several movements take place as hereinabove described but with the guessing mechanism locked in a given relative position.

In my co-pending application, Serial No. 516,551, filed November 21, 1921, I have illustrated and described a coin-operated releasing mechanism which is in all material respects like certain parts of the mechanism shown herein, including such parts as the coin plate 94, the arm 95, the rack-bar 104 and some mechanisms associated therewith, and reference may be had to that application for a further illustration and description of those operative details. I may mention here that the counter-weighted rack member 170 pivoted at 171 on the main lever 50, and the counter weighted dog member 172 are adapted to restore the coin plate 94 to its original position when the person steps off of the platform.

I may add, with respect to the function of the mechanism shown in the lower portions of Figs. 2 and 3 and in Fig. 4 and the increased movement of the rod 45 relative to that of the rod 31, that this insures the necessary movement of the swinging plate 127 whereby the notch 132 will be brought opposite the stud 137 even though but very slight downward movement of the rod 31 take place, as when a person of but small weight is upon the platform.

In connection with the delayed movement induced by the yielding resistance of the cylinder 122 and its piston, it may be pointed out that an important function of this feature is to enable the rotating plate 100 (Fig. 8) to come to rest before the notch 132 in the plate 127 comes opposite the stud 137. When a person steps upon the platform there occurs the natural oscillation of parts due to the automatic finding of the equilibrium, as usual in balances, and it takes a few seconds for the plate having the notch 100 (Fig. 8) to quiet down. The cylinder 122 and its piston provides this desired delay so that when the notch 132 is opposite the pin or stud 137, the disc 101 will have become quiescent.

While I have thus illustrated and described a highly effective embodiment of these improvements, the invention is not limited to the details of construction or arrangement of parts shown, and reference should be had to the appended claims to determine the scope of the improvements herein set forth.

I claim:

1. In a scale of the character described, comprising weighing means which include a platform, a dial having weight-indicating graduations, two pointers independently movable relative to said graduations, one pointer being a weighing pointer and movable by the weighing means and the other being a guessing pointer and movable by hand, and means including coin-actuated mechanism for causing the weighing pointer to indicate weight on said graduations when a weight is on said platform and a coin is deposited in the device, the combination therewith of means for returning the coin to the operator when the weighing pointer indicates substantially the same weight as does the guessing pointer on said graduations, said last-mentioned means including a device operable by the weighing mechanism to assume a relative position according to the weight upon said platform, a device mounted to assume a relative position according to the position of the guessing pointer when said guessing pointer is moved by hand, said two devices having means respectively adapted to coact with each other to provide a path of movement for a part carried by one of said devices and mounted to move in such path when said pointers indicate the same weight and to provide an obstruction to the movement of said part when said pointers indicate substantially different weights, a part carried by one of said devices and mounted to move in such path when said pointers indicate the same weight, and coin-deflecting means operable through the movement of said last-mentioned part.

2. The combination of claim 1 hereof in which one of said devices which assume relative positions respectively and coact with each other is in the form of a plate having a recess therein and the other of said devices includes a movable member arranged to travel over a surface of said plate and to enter said recess and thereby coact with the other member in providing for movement of the part controlling the movement of the coin deflecting means when the two pointers indicate the same weight.

3. The combination of claim 1 hereof in which one of said coacting devices is mounted to rotate and has a surface at right angles to the axis of rotation, said rotatable device having a recess, the other of said coacting devices including a part mounted to rotate and to move over said surface of said plate and to enter said recess when the two pointers indicate the same weight.

4. The combination of claim 1 hereof in which there are also means for providing a delay in the movement of said part controlling the movement of the coin-deflecting means whereby the weighing pointer will substantially come to rest before the movement of said part can take place.

5. The combination of claim 1 hereof in which there are also means for providing sufficient delay in the movement of said part controlling the movement of the coin-deflecting means to permit the weighing pointer substantially to come to rest, said last-mentioned means including a cylinder-and-piston device having a movable piston and a movable coacting device adapted to move only when the piston reaches a predetermined relative position in its path of movement.

6. The combination of claim 1 hereof in which the movement of said part when the pointers indicate the same weight is controlled by means including a member having a slot therein, and a member positioned in said slot, one of said last mentioned members being movable with respect to the other thereof in a line of travel predetermined by the direction of said slot, the member having said slot being formed to permit movement by the movable one of said members in another direction than said predetermined line of travel at a predetermined place in the travel of said movable member.

7. The combination of claim 1 hereof in which there is a control mechanism operatively connected to one of said devices which coact with the other thereof in the coin-returning operation, said last-mentioned mechanism having a member mounted for movement in substantially a given line of travel, with means for causing it to move substantially slowly in such line of travel, together with means for releasing said last-mentioned member to move out of said line of travel when the pointers indicate the same weight.

8. The combination of claim 1 hereof in which the weighing means include a rod adapted to communicate motion from the platform in the weighing operation, means for providing delay in the movement of said part controlling the movement of the coin-deflecting means, and means controlled by the movement of said rod for returning the delay-providing means to their initial position after a weighing operation.

9. The combination of claim 1 hereof in which there are means for providing delay in the movement of said part controlling the movement of the coin-deflecting means, the delay-provided means including a spring under tension and a slow-moving cushioning member operatively connected to the spring so to be moved thereby when released, releasing means for said delay-providing means, tripping means adapted to be operated by a coin deposited in the device, said releasing means being operably connected to said tripping means.

10. Coin-deflecting mechanism for a weighing scale of the character described, comprising, in combination, a pivoted lever, a spring for moving said lever, a cylinder, a piston in said cylinder and connected to said lever so as to be moved thereby, said cylinder-and-piston device having provisions for inducing a relatively slow movement of the lever under the pressure of said spring, means for holding said lever releasably, means for releasing said lever a movable member connected to said lever to be moved thereby, means for maintaining the movement of said movable member in a given path of travel throughout the greater part of its movement, a coin-deflecting device, and a movable element operatively connected with the coin-deflecting device to operate the same, the effective movement of said movable element being under the control of said movable member at a given place in said path of travel.

11. In a scale of the character described comprising weighing means including a platform, a dial having weight-indicating graduations, two pointers independently movable relative to said graduations, one pointer being a weighing pointer and movable by the weighing means and the other being a guessing pointer having means for moving it by hand, and means including coin-actuated mechanism for causing the weighing pointer to indicate weight on said graduations when a weight is on said platform and a coin is deposited in the device, the combination therewith of means wholly under the control of the weight upon said platform and of said guessing-pointer-moving means and including a pair of rotatable members face to face and an element on one thereof adapted to interengage with a recess on the other thereof only when said element and recess are substantially opposite each other for returning the coin to the operator when the two pointers indicate substantially the same weight on said graduations, and for retaining the coin when the two pointers indicate materially different weights.

12. In a weighing scale of the character described the combination of a dial, a weighing pointer and a guessing pointer mounted to rock on the same axis and travel over said dial, one of said pointers being mounted on a hollow shaft, the other being mounted on a shaft within said hollow shaft, the shaft of the weighing pointer carrying a member for rotation, a third shaft on the axis of said other two shafts, said third shaft carrying a rotatable member adapted to cooperate with the rotatable member carried by the weighing pointer shaft, manually-operated means for simultaneously moving the guessing pointer and the member on said third shaft with a corresponding rotative movement, means carried by each of said members adapted to come into position for cooperation with each other when and only when the two pointers indicate substantially the same weight on the dial, a movable device mounted for movement to bring said two members into cooperation with each other when the two pointers indicate substantially the same weight, and means controlled by the movement of said movable member for deflecting the coin in a predetermined direction.

GUSTAV F. HOCHRIEM.